United States Patent
Kim et al.

(10) Patent No.: US 10,693,522 B1
(45) Date of Patent: Jun. 23, 2020

(54) METHOD AND DEVICE FOR PERFORMING PUCCH FEEDBACK ON BASIS OF BEAMFORMED CSI RS RESOURCE IN WIRELESS COMMUNICATION SYSTEM

(71) Applicant: LG ELECTRONICS INC., Seoul (KR)

(72) Inventors: Heejin Kim, Seoul (KR); Jiwon Kang, Seoul (KR); Kilbom Lee, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/756,008

(22) PCT Filed: Sep. 5, 2016

(86) PCT No.: PCT/KR2016/009895
§ 371 (c)(1),
(2) Date: Feb. 27, 2018

(87) PCT Pub. No.: WO2017/039414
PCT Pub. Date: Mar. 9, 2017

Related U.S. Application Data

(60) Provisional application No. 62/214,214, filed on Sep. 4, 2015.

(51) Int. Cl.
*H04B 1/16* (2006.01)
*H04B 1/71* (2011.01)
(Continued)

(52) U.S. Cl.
CPC .............. *H04B 1/71* (2013.01); *H04W 76/20* (2018.02); *H04B 7/0626* (2013.01);
(Continued)

(58) Field of Classification Search
CPC ...... H04B 1/71; H04B 7/0617; H04B 7/0626; H04B 7/0639; H04W 76/01; H04W 88/02; H04M 1/72519; H04M 1/72522
(Continued)

(56) References Cited

U.S. PATENT DOCUMENTS 9,374,716 B2 * 6/2016 Enescu ................. H04W 24/02
2014/0177745 A1 * 6/2014 Krishnamurthy .... H04B 7/0413
375/267
(Continued)

FOREIGN PATENT DOCUMENTS

WO 2012125931 9/2012

OTHER PUBLICATIONS

PCT International Application No. PCT/KR2016/009895, International Search Report dated Dec. 15, 2016, 2 pages.
(Continued)

*Primary Examiner* — Danh C Le
(74) *Attorney, Agent, or Firm* — Lee Hong Degerman Kang & Waimey

(57) ABSTRACT

A method and a device for transmitting channel state information (CSI) in a wireless communication system are provided. A terminal performs a measurement on the basis of at least one beamformed CSI reference signal (RS) resource, and transmits, to a base station, the CSI and information relating to preferred beam on the basis of the measurement result, wherein the CSI includes a precoding type indicator (PTI), and the PTI indicates whether the measurement is based on a CSI RS resource which is not precoded, or is based on the beamformed CSI RS resource.

10 Claims, 16 Drawing Sheets

(51) Int. Cl.
*H04W 76/20* (2018.01)
*H04B 7/06* (2006.01)
*H04M 1/725* (2006.01)
*H04W 88/02* (2009.01)

(52) U.S. Cl.
CPC ....... *H04B 7/0639* (2013.01); *H04M 1/72519* (2013.01); *H04M 1/72522* (2013.01); *H04W 88/02* (2013.01)

(58) Field of Classification Search
USPC .................................... 455/434, 550.1, 418
See application file for complete search history.

(56) References Cited

U.S. PATENT DOCUMENTS

| | | | |
|---|---|---|---|
| 2015/0055723 A1 | 2/2015 | Kim et al. | |
| 2015/0131565 A1* | 5/2015 | Nakashima | H04L 1/0026 370/329 |
| 2016/0373178 A1* | 12/2016 | Nam | H04B 7/0639 |
| 2018/0034612 A1* | 2/2018 | Lin | H04L 5/0048 |
| 2018/0076940 A1* | 3/2018 | Zhou | H04W 16/28 |
| 2018/0123668 A1* | 5/2018 | Kwak | H04B 7/0626 |
| 2018/0138950 A1* | 5/2018 | Rahman | H04B 7/0417 |
| 2018/0241454 A1* | 8/2018 | Lee | H04B 7/06 |
| 2018/0294848 A1* | 10/2018 | Park | H04B 7/0417 |
| 2018/0343045 A1* | 11/2018 | Muruganathan | H04B 17/104 |
| 2018/0343046 A1* | 11/2018 | Park | H04W 76/27 |
| 2019/0036579 A1* | 1/2019 | Wei | H04B 7/0486 |
| 2019/0089441 A1* | 3/2019 | Sivahumaran | H04B 7/0478 |
| 2019/0123864 A1* | 4/2019 | Zhang | H04B 7/088 |

OTHER PUBLICATIONS

Ericsson et al., "Merged WFs on CSI reporting", 3GPP TSG RAN WG1 Meeting #80bis, R1-152425, Apr. 2015, 11 pages.

Etri, "Discussion on configuration of CSI measurement and feedback for EB/FD-MIMO", 3GPP TSG RAN WG1 Meeting #82, R1-154394, Aug. 2015, 5 pages.

Samsung, "CSI process and CSI-RS configuration for Rel.13 FD-MIMO", 3GPP TSG RAN WG1 Meeting #82, R1-154156, Aug. 2015, 7 pages.

* cited by examiner

METHOD AND DEVICE FOR PERFORMING PUCCH FEEDBACK ON BASIS OF BEAMFORMED CSI RS RESOURCE IN WIRELESS COMMUNICATION SYSTEM

CROSS-REFERENCE TO RELATED APPLICATIONS

This application is the National Stage filing under 35 U.S.C. 371 of International Application No. PCT/KR2016/009895, filed on Sep. 5, 2016, which claims the benefit of U.S. Provisional Application No. 62/214,214, filed on Sep. 4, 2015, the contents of which are all hereby incorporated by reference herein in their entirety.

BACKGROUND OF THE INVENTION

Field of the Invention

The present invention relates to wireless communication and, more particularly, to a method and an apparatus for performing physical uplink control channel (PUCCH) feedback by using beamformed channel state information reference signal (CSI RS) resources in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As a way to improve the efficiency of limited resources, so-called multi-antenna technology is being actively developed which achieves diversity gain by putting multiple antennas on the transmitter and receiver to cover more spatial regions for resource utilization, and which increases transmission capacity by transmitting data in parallel through each antenna. Multi-antenna technology may employ beamforming and/or precoding to improve signal-to-noise ratio (SNR). In closed-loop systems that can use feedback information at the transmitting end, beamforming and/or precoding may be used to maximize SNR through such feedback information. Beamforming is broadly classified into analog beamforming and digital beamforming.

In conventional cellular systems, a base station employs a passive antenna system (PAS) and applies a mechanical tilting or an electrical tilting technique, among antenna tilting techniques, to the PAS to reduce inter-cell interference and to improve signal to interference and noise ratio (SINR). However, mechanical tilting has a drawback that a beam direction of an antenna is fixed once it is initially installed, and thus, beamforming may not be adaptively applied. On the other hand, electrical tilting is useful since antenna tilting angle may be changed by using an internal phase shift module. However, electrical tilting still has a drawback that in fact, antenna tilting is set in a cell-specific manner and thus only vertical beamforming across a very limited range is allowed.

Therefore, to improve beamforming performance, introduction of active antenna system (AAS), which has more advanced features than the PAS, is being discussed. Different from existing passive antenna systems, each antenna module of an active antenna system uses a radio frequency (RF) module including a power amplifier, namely active components, by which power and phase control for each antenna module is possible.

Also, by using an active antenna system, a 3D multiple-input multiple-output (MIMO) and/or 3D beamforming may be implemented. By receiving channel state information (CI) from a user equipment in the form of feedback, a base station may realize 3D MIMO and/or 3D beamforming in an effective manner. To implement 3D MIMO and/or 3D beamforming that provides more improved performance, there is a need to improve a method for a mobile terminal to feed CSI back to a base station.

SUMMARY OF THE INVENTION

The present invention provides a method and an apparatus for performing physical uplink control channel (PUCCH) feedback by using beamformed channel state information reference signal (CSI RS) resources in a wireless communication system. The present invention provides a method and an apparatus for reporting CSI through PUCCH on the basis of beamformed CSI RS resources for 3D multiple-input multiple-output (MIMO). The present invention provides a method for configuring 3D CSI information by using a beamformed CSI RS in a 2D antenna array environment and a method and an apparatus for reporting the 3D CSI information through PUCCH.

In an aspect, a method for transmitting channel state information (CSI) by a user equipment (UE) in a wireless communication system is provided. The method includes performing measurement on the basis of at least one beamformed CSI reference signal (RS) resource, and transmitting information on a preferred beam and the CSI to a base station on the basis of the measurement result. The CSI includes a precoding type indicator (PTI), and the PTI indicates whether the measurement is based on a non-precoded CSI RS resource or whether the measurement is based on the beamformed CSI RS resource.

In another aspect, a user equipment (UE) in a wireless communication system is provided. The UE includes a memory, a transceiver, and a processor, operably coupled to the memory and the transceiver, that performs measurement on the basis of at least one beamformed channel state information reference signal (CSI RS) resource, and controls the transceiver to transmit information on a preferred beam and the CSI to a base station on the basis of the measurement result. The CSI includes a precoding type indicator (PTI), and the PTI indicates whether the measurement is based on a non-precoded CSI RS resource or whether the measurement is based on the beamformed CSI RS resource.

According to the present invention, a base station can implement 3D MIMO or 3D beamforming in an effective manner.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
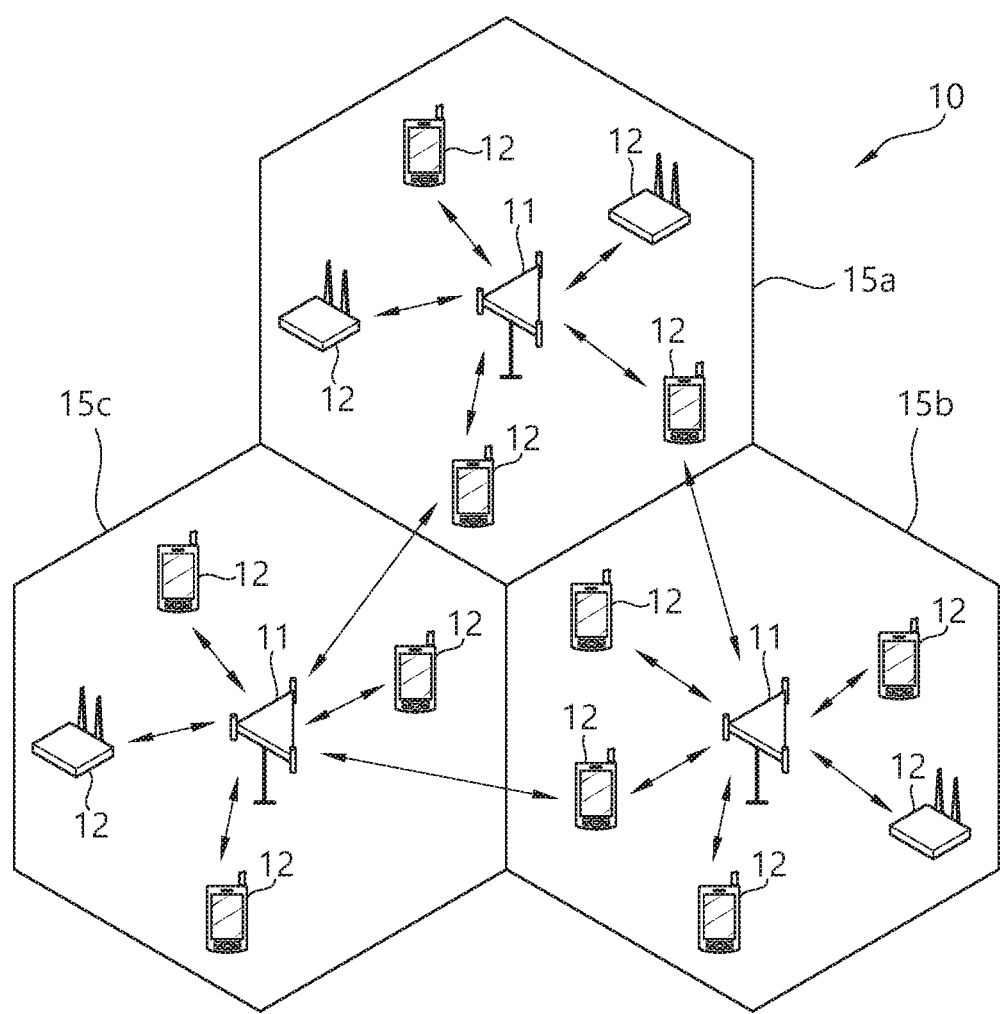
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The cellular system includes a different cell adjacent to the serving cell. The different cell adjacent to the serving cell is called a neighbor cell. A BS providing a communication service to the neighbor cell is called a neighbor BS. The serving cell and the neighbor cell are relatively determined based on a UE.

This technique can be used for downlink (DL) or uplink (UL). In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

Figure 2:
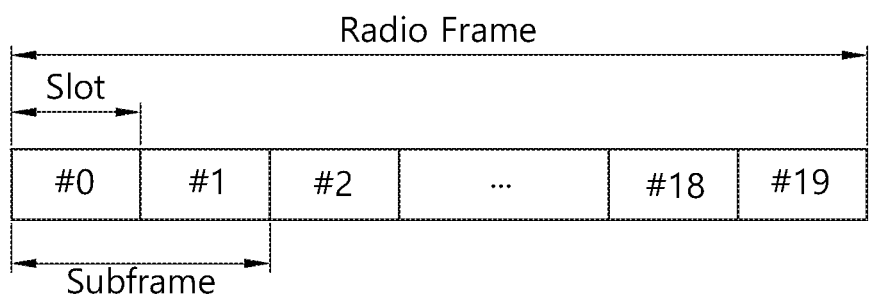
FIG. 2 shows a structure of a radio frame of 3GPP LTE.

FIG. 2 shows a structure of a radio frame of 3GPP LTE. Referring to FIG. 2, a radio frame consists of 10 subframes, and a subframe consists of two slots. Slots within the radio frame are numbered from #0 to #19. A transmission time interval (TTI) is a basic scheduling unit for data transmission. In 3GPP LTE, one TTI may be equal to the time it takes for one subframe to be transmitted. One radio frame may have a length of 10 ms, one subframe may have a length of 1 ms, and one slot may have a length of 0.5 ms.

One slot includes a plurality of orthogonal frequency division multiplexing (OFDM) symbols in time domain and a plurality of subcarriers in frequency domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners. 3GPP LTE defines one slot as 7 OFDM symbols in a normal cyclic prefix (CP) and one slot as 6 OFDM symbols in an extended CP.

Now, 3D beamforming is described. The conventional MIMO antenna arrangement is based on a linear structure such as uniform linear array (ULA), namely one-dimensional antenna arrangement structure. A two-dimensional plane is generated from a one-dimensional antenna arrangement structure by collecting beams that may be generated by beamforming. This is also true for a MIMO antenna structure based on a passive antenna system (PAS) in which an eNB has a horizontal and a vertical antenna (namely two-dimensional antenna arrangement structure). In a PAS-based MIMO antenna structure, a vertical antenna is fastened to one radio frequency RF) module, and therefore, only mechanical tilting is allowed, and beamforming in a perfect vertical direction is not possible. However, as the antenna structure of the eNB evolves to the active antenna system (AAS), each vertical antenna of the eNB may have an independent RF module, and thus beamforming not only in the horizontal direction but also in the vertical direction may be possible. Beamforming in the vertical direction is also called elevation beamforming. As a result, in the AAS-based MIMO antenna structure, if beams that may be generated from beamforming are collected, a three-dimensional space is formed in the vertical and horizontal direction, which is called 3D beamforming. In other words, 3D beamforming has become possible as the one-dimensional antenna arrangement structure evolves to a two-dimensional antenna arrangement structure in the form of a plane. The antenna arrangement structure does not necessarily have to be a planar form, but three-dimensional antenna arrangement structure in the form of a conformal ring array is also possible. In other words, 3D beamforming may be regarded as performing a MIMO process in the three-dimensional space by using various forms of 2D or 3D antenna arrangement structure rather than the existing 1D antenna arrangement structure.

Figure 3:
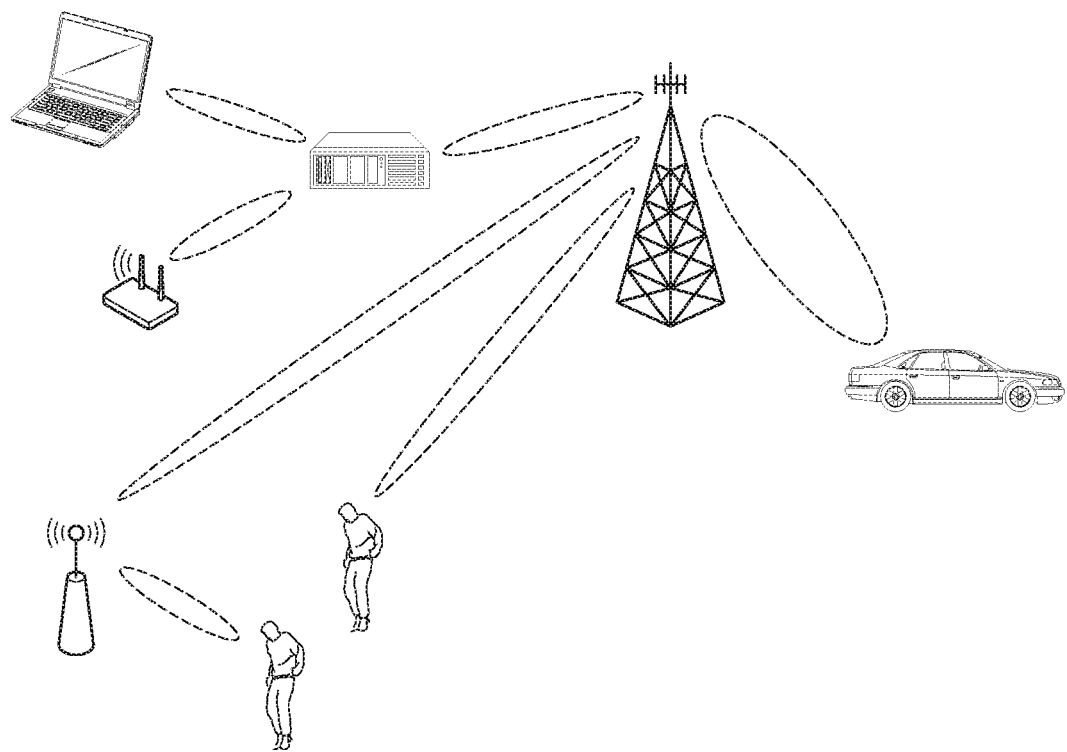
FIG. 3 illustrates one example of UE-specific beam transmission according to AAS-based 3D beamforming.

FIG. 3 illustrates one example of UE-specific beam transmission according to AAS-based 3D beamforming. Referring to FIG. 3, 3D beamforming enables a UE to perform beamforming when the UE moves not only left and right but also back and forth, making UE-specific beam transmission performed more freely.

Figure 4:
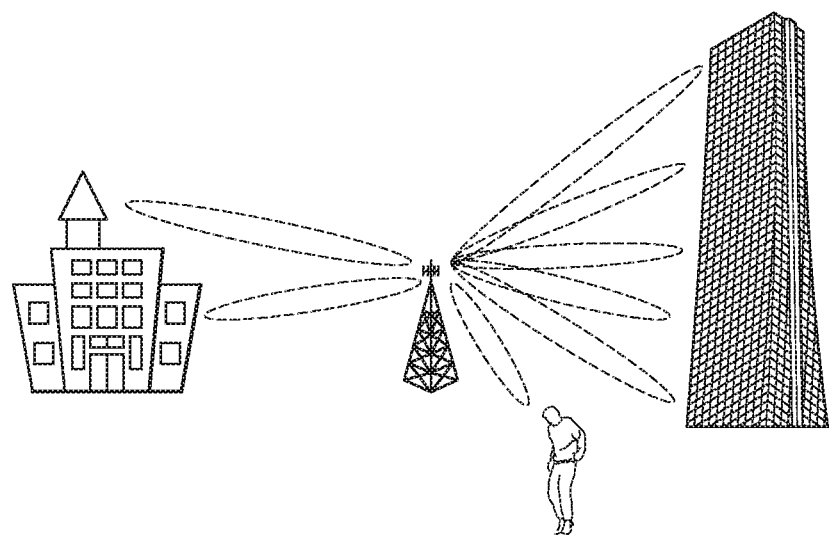
FIG. 4 illustrates one example of vertical beam transmission according to AAS-based 3D beamforming.

FIG. 4 illustrates one example of vertical beam transmission according to AAS-based 3D beamforming. Transmission environments using the AAS-based two-dimensional antenna arrangement structure may include not only the environment in which an outdoor eNB transmits a beam to a UE in the outdoor space but also the environment (O2I; outdoor to indoor) in which an outdoor eNB transmits a beam to a UE in the indoor space and the environment in which an indoor eNB (indoor hotspot) transmits a beam to a UE in the indoor space. Referring to FIG. 4, when various types of buildings exist within a cell, an eNB may have to take into account vertical beam steering which accommodates to the height of a UE varying according to the height of a building as well as horizontal beam steering. In these cell environments, channel characteristics quite different from existing wireless channel environments (for example, shading due to height difference/change of path loss, line-of-sight (LOS)/non-line-of-sight (NLOS), and direction-of-arrival (DOA)) may have to be taken into account.

Channel state information (CSI) feedback in the 3GPP LTE system is described. In most cellular systems including the 3GPP LTE system, a UE receives a reference signal (RS) for channel estimation from an eNB, calculates CSI on the basis of the received RS, and report the calculated CSI to the eNB. The eNB transmits data on the basis of the CSI fed back from the UE. The CSI fed back from the UE may include at least one of channel quality information (CQI), precoding matrix index (PMI), and rank indicator (RI). CSI may be calculated over the whole system frequency region or over part of the frequency region. In particular, it may be useful for a system employing OFDMA to calculate the CSI over a preferred frequency region (for example, sub-band) of each UE and to feed back the calculated CSI.

CQI is radio channel quality information used for determining which modulation & coding scheme (MCS) to apply when an eNB transmits data (namely used for link adaptation). If the radio channel quality is good between an eNB and a UE, the UE feeds back high CQI to the eNB, and the eNB is then able to transmit data to the UE by applying a relatively high modulation order and low channel coding rate. On the other hand, if the radio channel quality is poor, the UE feeds back low CQI, and the eNB may transmit data to the UE by applying a relatively low modulation order and high channel coding rate.

PMI is preferred precoding matrix information used for determining which MIMO precoding matrix to apply when an eNB has multiple antennas. A UE estimates a DL MIMO channel between the eNB and the UE on the basis of a reference signal and recommends a MIMO precoding matrix preferred by the UE from the estimated DL MIMO channel. The 3GPP LTE system supports only linear MIMO precoding which may be expressed in the form of a matrix. The eNB and the UE already know a codebook constructed from a plurality of MIMO precoding matrices, where each MIMO precoding matrix belonging to the codebook has a unique index. Therefore, the UE minimizes the amount of feedback information by feeding back the index corresponding to the most preferred MIMO precoding matrix within the codebook to the eNB as the PMI.

The RI is the information indicating the number of UE-preferred transmission layers when an eNB and a UE have multiple antennas, and multiple layer transmission is supported through spatial multiplexing. Since an eNB needs to know which MIMO precoding matrix to apply to each transmission layer according to the number of transmission layers, the RI is closely related to the PMI. The 3GPP LTE system defines a PMI codebook according to the number of each transmission layer. In other words, for R transmission layers, N matrices of size Nt*R are defined within the codebook. At this time, Nt represents the number of transmission antenna ports, and N represents the size of the codebook. In other words, the size of a PMI codebook is defined irrespective of the number of transmission layers. The number of transmission layers, R, coincides with the rank of the MIMO precoding matrix.

Meanwhile, the PMI/RI described in what follows are not limited to the index of a MIMO precoding matrix expressed by a matrix of size Nt*R and the rank of the MIMO precoding matrix as defined in the 3GPP LTE specification. The PMI described in what follows may represent information about a MIMO precoder preferred by a receiving end among the MIMO precoders applicable at a transmitting end. And the form of the MIMO precoder is not limited to a linear MIMO precoder that may be expressed by a matrix form. Also, the RI described in this document may include all of the information representing the number of transmission layers.

Also, the PMI described in what follows does not necessarily have to be composed of only one index. For example, a dual structure PMI may be constructed. In other words, W1 which indicates a long-term and/or wideband PMI and/or W2 which indicates a short-term and subband PMI may be constructed while a final PMI, W, may be constructed by W=W1*W2. For example, when the number of transmission antenna ports is 8 or 4, and it is configured by RRC signaling such that alternativeCodeBookEnabledFor4TX-r12=TRUE, a dual structure PMI, which is composed of the indexes of the wideband PMI and subband PMI, may be constructed.

CSI feedback is transmitted from the UE to the eNB through a UL channel. In general, non-periodic CSI feedback is transmitted through physical uplink shared channel (PUSCH), a channel to which UL data is transmitted, and periodic CSI feedback is transmitted through physical uplink control channel (PUCCH), a channel to which UL control information (UCI) is transmitted.

Non-periodic CSI feedback is temporarily fed back only when the eNB requires CSI feedback. The eNB may trigger CSI feedback through a DL control channel such as physical downlink control channel (PDCCH)/enhanced PDCCH (EP-DCCH). When the eNB triggers CSI feedback, according to the PUSCH CSI reporting mode, the UE may feed the corresponding CSI back to the eNB. The eNB may inform the UE of the PUSCH CSI reporting mode through the upper layer. Table 1 illustrates one example of the PUSCH CSI reporting mode.

TABLE 1

| | | PMI Feedback Type | |
|---|---|---|---|
| | | No PMI (OL, TD, single-antenna) | With PMI (CL) |
| PUSCH CQI feedback type | Wideband (wideband CQI) | | Mode 1-2: Multiple PMI<br>RI<br>$1^{st}$ wideband CQI (4 bit)<br>$2^{nd}$ wideband CQI (4 bit) if RI > 1<br>Subband PMIs on each subband |
| | UE Selected (subband CQI) | Mode 2-0<br>Wideband CQI (4 bit) +<br>Best-M CQI (2 bit)<br>Best-M index<br>when RI > 1, CQI of first codeword | Mode 2-2: Multiple PMI<br>RI<br>$1^{st}$ wideband CQI (4 bit) + Best-M CQI (2 bit)<br>$2^{nd}$ wideband CQI (4 bit) + Best-M CQI (2 bit) if RI > 1<br>Wideband PMI    Best-M PMI<br>Best-M index |
| | Higher layer-configured (subband CQI) | Mode 3-0<br>RI (only for Open-loop SM)<br>wideband CQI (4 bit) +<br>subband CQI (2 bit)<br>when RI > 1, CQI of first codeword | Mode 3-1: Single PMI<br>RI<br>$1^{st}$ wideband CQI (4 bit) + subband CQI (2 bit)<br>$2^{nd}$ wideband CQI (4 bit) + subband CQI (2 bit) if RI > 1<br>Wideband PMI |

Periodic CSI feedback is fed back periodically from the UE to the eNB. To transmit various types of UCI on the PUCCH, various PUCCH formats are defined, and the periodic CSI feedback may be transmitted through one of the PUCCH format 2/2a/2b/3. Also, according to the PUCCH CSI reporting mode, the UE may feed the corresponding CSI back to the eNB. Table 2 illustrates one example of the PUCCH CSI reporting mode.

TABLE 2

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-loop SM)<br>One wideband CQI (4 bit)<br>When RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE selected | Mode 2-0<br>RI (only for Open-loop SM)<br>Wideband CQI (4 bit)<br>Best-1 CQI (4 bit) in each BP<br>Best-1 indicator (L-bit label)<br>When RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) in each BP<br>Best-1 spatial CQI (3 bit) for RI > 1<br>Best-1 indicator (L-bit label) |

Also, in addition to the PUCCH CSI reporting mode, a PUCCH reporting type may be defined. Table 3 illustrates one example of the PUCCH reporting type.

TABLE 3

| PUCCH Reporting Type | Reported | Mode State | Mode 1-1 (bits/BP*) | Mode 2-1 (bits/BP*) | Mode 1-0 (bits/BP*) | Mode 2-0 (bits/BP*) |
|---|---|---|---|---|---|---|
| 1 | Sub-band CQI | RI = 1 | NA | 4 = L | NA | 4 = L |
| | | RI > 1 | NA | 7 = L | NA | 4 = L |
| 1a | Sub-band CQI/ second PMI | 8 antenna ports RI = 1 | NA | 8 = L | NA | NA |
| | | 8 antenna ports 1 < RI < 5 | NA | 9 = L | NA | NA |
| | | 8 antenna ports RI > 4 | NA | 7 = L | NA | NA |
| | | 4 antenna ports RI = 1 | NA | 8 = L | NA | NA |
| | | 4 antenna ports 1 < RI ≤ 4 | NA | 9 = L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI >1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| | | 4 antenna ports 1 ≤ R1 ≤ 2 | NA | 4 | NA | NA |
| | | 4 antenna ports 2 ≤ R1 ≤ 4 | NA | NA | NA | NA |

TABLE 3-continued

| PUCCH Reporting Type | Reported | Mode State | Mode 1-1 (bits/BP*) | Mode 2-1 (bits/BP*) | Mode 1-0 (bits/BP*) | Mode 2-0 (bits/BP*) |
| --- | --- | --- | --- | --- | --- | --- |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| | | 4 antenna ports RI = 1 | 8 | 8 | NA | NA |
| | | 4 antenna port 1 < RI ≤ 4 | 11 | 11 | NA | NA |
| 2c | Wideband CQI/ first PMI/ second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| | | 4 antenna ports RI = 1 | 8 | NA | NA | NA |
| | | 4 antenna port 1 < RI ≤ 4 | 11 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA | NA |
| | | 4 antenna ports, 4-layer spatial multiplexing | 2 | 2 | 2 | 2 |
| | | 8 antenna ports, 4-layer spatial multiplexing | 2 | NA | NA | NA |
| | | 8-layer spatial multiplexing | 3 | NA | NA | NA |
| 4 | Wideband CQI | RI =1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| | | 4 antenna ports, 2-layer spatial multiplexing | 4 | | | |
| | | 4 antenna ports, 4-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |
| | | 4 antenna ports, 2-layer spatial multiplexing | NA | 2 | NA | NA |
| | | 4 antenna ports, 4-layer spatial multiplexing | NA | 3 | NA | NA |

Referring to Table 3, from the PUCCH CSI reporting mode and the PUCCH reporting type according to the mode, size of the CSI feedback to be transmitted is determined. L≥0, and the best-1 CQI subband indicator selected by the UE corresponds to the L bits. Also, the PUCCH CSI reporting mode determines which CSI to be reported, and at a specific PUCCH CSI reporting mode, according to the PUCCH reporting type and the size of CSI feedback to be transmitted, information to be included in the CSI transmitted at a specific time point (or subframe) may be determined. Therefore, depending on the PUCCH CSI reporting mode, the time at which CQI and PMI are transmitted may become different from the time at which RI is transmitted.

The PUCCH reporting type may be divided into CSI feedback which includes RI and CSI feedback which does not include RI. In other words, the PUCCH reporting types 1, 1a, 2, 2a, 2b, 2c, and 4 are CSI feedback which does not include RI while the remaining PUCCH reporting types are CSI feedback which includes RI. The CSI feedback which does not include RI may include CQI and/or PMI of which the value is determined according to a previously reported RI or precoding type indicator (PTI).

Also, the PUCCH reporting type may be divided into CSI feedback which transmits only the wideband CQI and CSI feedback which transmits both the wideband CQI and the subband CQI. In the case of the PUCCH reporting type which transmits only the wideband CQI, the CQI for the entire frequency bands is transmitted from a subframe corresponding to the CQI transmission period, and when the PMI also has to be transmitted according to the PMI feedback type, the PMI may be transmitted together with the CQI.

In the PUCCH reporting type in which both the wideband CQI and the subband CQI are transmitted, the wideband CQI and the subband CQI may be transmitted in an alternate fashion. For example, the wideband CQI may be transmitted from a first CQI transmission subframe, and among the subbands belonging to a first bandwidth part (BP) of the next CQI transmission subframe, CQI of a subband exhibiting a good channel condition and the index of the corresponding subband may be transmitted. In the next CQI transmission subframe, among the subbands belonging to a second BP, CQI of a subband exhibiting a good channel condition and the index of the corresponding subband may be transmitted. Information about how many times each subband CQI is to be transmitted sequentially may be signaled through the upper layer (for example, RRC layer). Also, RI feedback period and offset; and CQI/PMI feedback period and offset may also be set to the UE through a message transmitted through the upper layer.

Figure 5:
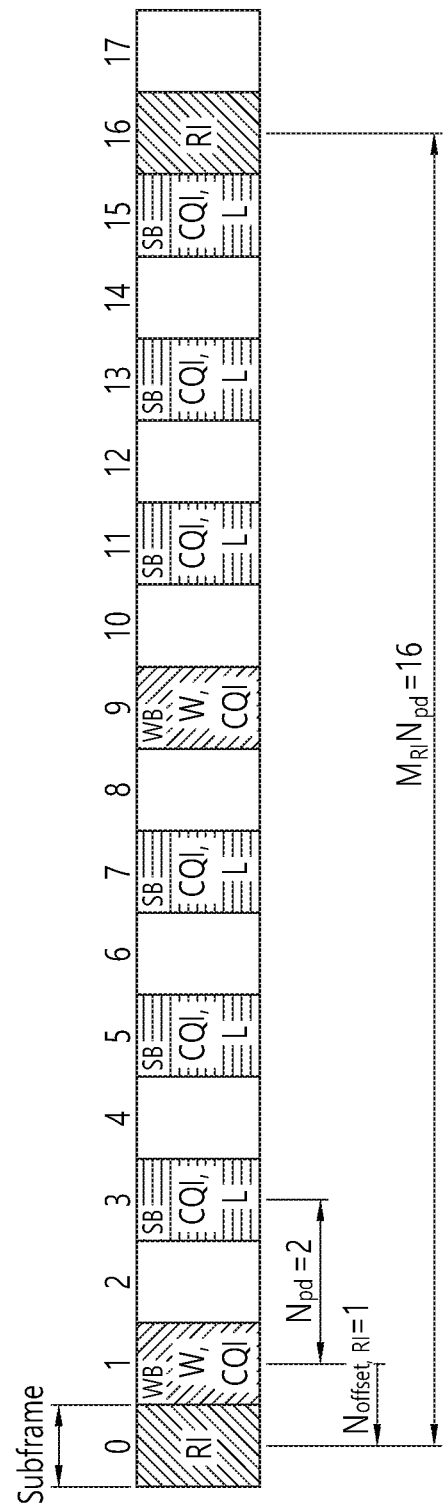
FIG. 5 illustrates one example of CSI feedback according to the PUCCH CSI reporting mode 2-1.

FIG. 5 illustrates one example of CSI feedback according to the PUCCH CSI reporting mode 2-1. Referring to FIG. 5, the CSI feedback according to the PUCCH CSI reporting mode 2-1 includes three kinds of CSI information. In a first subframe (subframe 0), RI is transmitted. In a second subframe (subframe 1), wideband PMI and wideband CQI are transmitted. At this time, the wideband PMI is a single structure PMI. In a fourth subframe (subframe 3), subband CQI and best-1 CQI subband indicator of L bits are transmitted.

Figure 6:
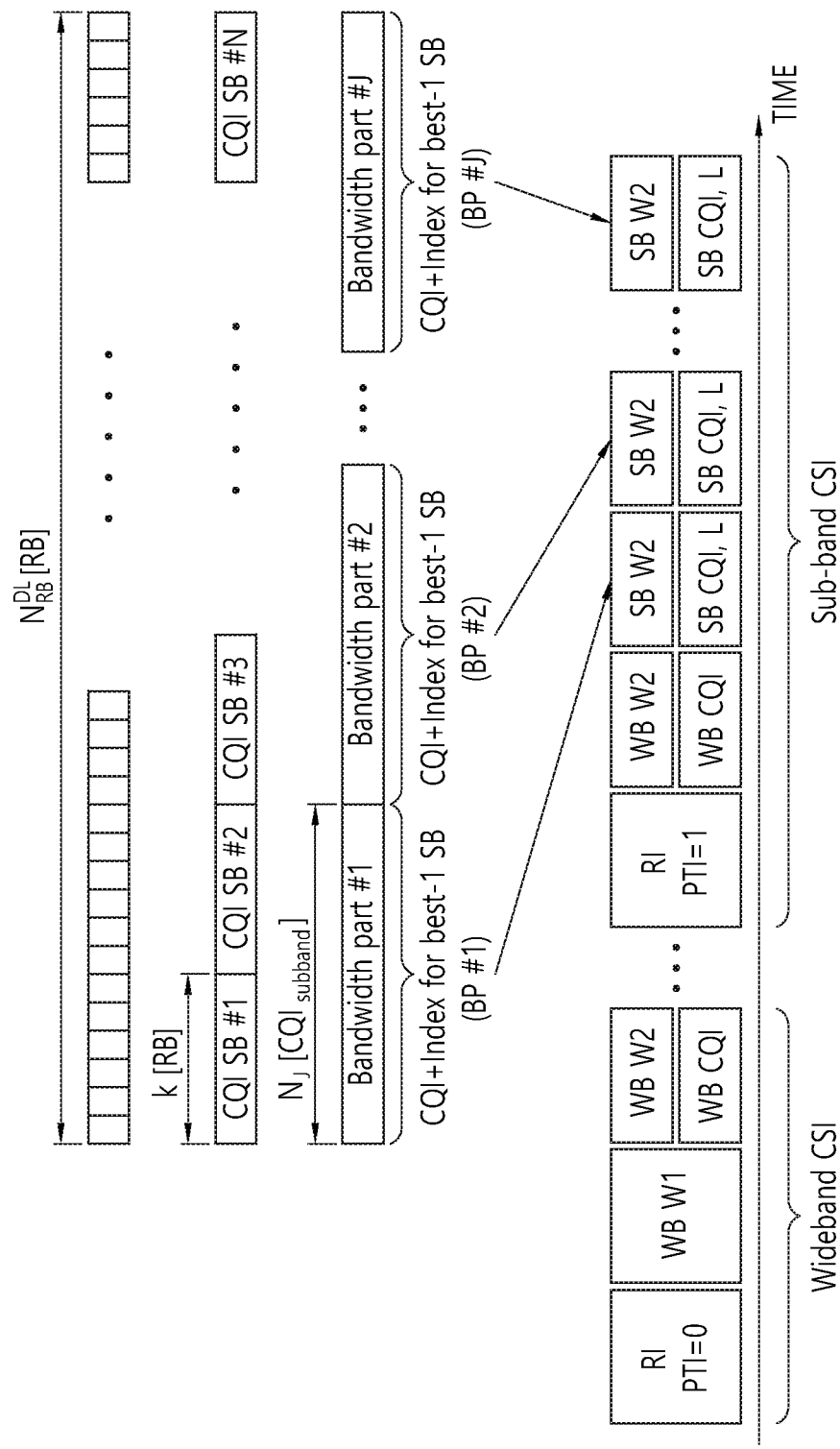
FIG. 6 illustrates another example of CSI feedback according to the PUCCH CSI reporting mode 2-1.

FIG. 6 illustrates another example of CSI feedback according to the PUCCH CSI reporting mode 2-1. As described above, when the number of transmission antenna ports is 8 or 4, and it is configured by RRC signaling such that alternativeCodeBookEnabledFor4TX-r12=TRUE, a dual structure PMI, which is composed of the indexes of the wideband PMI and subband PMI, may be constructed. Referring to FIG. 6, in a first subframe, PTI of 1 bit is transmitted in addition to the RI. According to the value of PTI, periodic CSI feedback may be transmitted in two different modes. For example, when PTI=0, only the wideband CQI/PMI is transmitted while, when PTI=1, subband CQI/PMI are transmitted together. In FIG. 6, W1 and W2 represent constituting elements of the dual structure PMI described above. The final PMI, W, may be constructed only after W1 and W2 are determined for both the wideband and the subband. In other words, the eNB may know the final W of the wideband and the subband only after both W1 and W2 are fed back with respect to the wideband and the subband and on the basis of the final W, CQI of the wideband and the subband may be determined.

As illustrated in FIGS. 5 and 6, since RI is usually determined by long-term fading of a channel, the RI may be fed back with a longer period (namely less frequently) compared with CQI/PMI. Meanwhile, when the value of a previously transmitted RI and/or PTI goes wrong, a mismatch may be caused between the eNB and the UE with respect to the size of the CSI feedback transmitted afterwards, and therefore, an error may occur in decoding of the CSI. Therefore, among subframes transmitting CSI, a first subframe includes only RI and/or PTI, thereby increasing the effective code rate of the RI and/or PTI.

Also, when RI is larger than 2, CQI of each subband may be expressed in a differential form. In other words, the subband CQI may be expressed by (subband CQI index–wideband CQI index). Also, when the number of bits for CSI feedback is larger than the size (for example, 11 bits) of the payload that may be carried by the PUCCH, a technique such as codebook subsampling may be employed to determine the maximum number of bits of the CSI feedback, which is limited by the payload size that the PUCCH may carry.

Now, a MIMO system model based on linear precoding is described. In a frequency unit (for example, a subcarrier) which may be assumed to experience flat fading to the frequency side in a wideband or narrowband system, a DL MIMO system may be modeled by Equation 1 below.

$$y = Hx + z \qquad \text{<Equation 1>}$$

In Equation 1, y represents a Nr*1 vector of received signals obtained from Nr reception antennas of the UE, H represents a MIMO channel matrix of size Nr by Nt, x represents an Nt*1 vector of transmission signals transmitted from Nt transmission antennas of the eNB, and z represents an Nr*1 vector of received noise and interference signals. The DL MIMO system model of Equation 1 may be applied not only to the single user MIMO (SU-MIMO) system but also to the multi-user MIMO (MU-MIMO) system. In the case of SU-MIMO, Nr may represent the number of reception antennas of a single UE while, in the case of MU-MIMO, Nr may represent the total number of reception antennas of multiple UEs. Also, the DL MIMO system model of Equation 1 may also be applied to the UL MIMO system. At this time, Nr may represent the number of transmission antennas of the UE, and Nr may represent the number of reception antennas of the eNB.

In general, a linear MIMO precoder may be expressed by a matrix U of size Nt by $N_S$. At this time, $N_S$ represents the rank, namely the number of transmission layers. Therefore, a transmission signal vector x may be modeled by Equation 2.

$$x = \sqrt{\frac{P_T}{N_s}} Us \qquad \text{<Equation 2>}$$

In Equation 2, $P_T$ represents the energy of a transmitted signal, s represents a transmission signal vector of size $N_S$*1 expressing signals transmitted from $N_S$ transmission layers. In other words, $E\{s^H U^H U s\} = N_S$. If a precoding vector of size Nt*1 corresponding to each of the $N_S$ transmission layers is denoted by U1, ..., $U_{NS}$, respectively, Equation 2 may be expressed by Equation 3 as shown below.

$$x = \sqrt{\frac{P_T}{N_s}} \sum_{i=1}^{N_s} u_i s_i \qquad \text{<Equation 3>}$$

In Equation 3, $s_i$ represents the i-th element of a vector s. In general, signals transmitted from different transmission layers are uncorrelated, and it may be assumed that the average magnitude of each transmission signal is the same to each other. For the purpose of convenience, if it is assumed that the average energy of each transmission signal is 1, the sum of energy of a precoding vector with respect to each transmission layer is given by $N_S$ as shown in Equation 4.

$$\sum_{i=1}^{N_s} E\{u_i^H u_i\} = N_s \qquad \text{<Equation 4>}$$

In Equation 4, if each transmission layer transmits a signal with the same power, it may be seen that $E\{u_i^H u_i\} = 1$.

Now, partitioned precoding is described. In a future, along with the advancement of multi-antenna system technology, the number of antennas employed is likely to increase gradually. For example, a proposal for the 3GPP LTE specification, which advocates to increase the number of transmission antennas of an eNB up to 64 by taking into account the 3D MIMO environment, is under consideration. The MIMO environment in which the number of antennas increases from tens to hundreds or more is referred to as a massive MIMO or a large scale MIMO. However, as the number of antennas is increased, overhead due to RS and feedback is increased, and decoding complexity is increased. More specifically, since the size of the MIMO channel matrix H is increased in proportion to the number of transmission antennas of an eNB, it is necessary to increase the number of RSs transmitted from the eNB so that a UE may estimate the MIMO channel accurately. Also, it is inevitable that the amount of feedback with respect to the MIMO channel measured by the UE is increased according as the size of the channel matrix H is increased. In particular, when feedback transmission of a codebook-based PMI is performed as in the 3GPP LTE specification, size of the PMI codebook increases exponentially according to the increase of the number of antennas, leading to the increase of computational complexity of the eNB and the UE.

Therefore, if a large number of the entire transmission antennas are partitioned and the RS is transmitted or fed back in sub-array units, system complexity and overhead may be reduced. When a transmission antenna is partitioned, RS transmission according to the conventional 3GPP LTE specification which supports up to 8 transmission antennas, MIMO precoding method and/or feedback method may be reused to support the massive MIMO system.

In the MIMO system model described above, if a precoding vector of each transmission layer is partitioned into M arbitrary sub-precoding vectors, the sub-precoding vector corresponding to the precoding vector of the i-th transmission layer may be expressed by Equation 5 below.

$$u_i = [u_{i,1}^T, u_{i,2}^T \ldots u_{i,M}^T]^T \quad \text{<Equation 5>}$$

Each sub-precoding vector experiences each sub-matrix as a valid channel, where as many sub-matrices as the number of transmission antennas of each partition are separated from the Nr*Nt MIMO channel H along the row direction.

When the UE determines each sub-precoding vector preferred by the UE on the basis of a PMI codebook, it is necessary to normalize each sub-precoding vector. Here, a normalization process refers to all of the steps performed to make a precoding vector or a value, magnitude and/or phase of a specific element in the precoding vector appropriate for selection from the corresponding PMI codebook. Accordingly, a sub-precoding vector of the same size may select a precoder from the PMI codebook with respect to the same number of transmission antennas. For example, if the first element of the PMI codebook is composed of 0s or 1s, the phase and magnitude of each sub-precoding vector may be normalized to match the corresponding element. In what follows, it is assumed that a sub-precoding vector $u_{i,m}$ corresponding to the m-th partition is normalized to $\alpha_{i,m}$, and a normalized partitioned precoder (NPP) is denoted by $v_{i,m} = u_{i,m}/\alpha_{i,m}$. Therefore, considering codebook-based precoding, partitioned precoding may be modeled by Equation 6 below.

$$u_i = [\alpha_{i,1} v_{i,1}^T \alpha_{i,2} v_{i,2}^T \ldots \alpha_{i,M} v_{i,M}^T]^T \quad \text{<Equation 6>}$$

Referring to Equation 6, from the viewpoint of the whole precoder, each $\alpha_{i,m}$ may be regarded as a value linking each NPP. Accordingly, in what follows, $\alpha_{i,m}$ is called a linking coefficient. As a result, if NPP for a partitioned transmission antenna and linking coefficients linking NPPs are determined, a precoding method for the whole transmission antenna may be determined.

Equation 7 expresses M linking coefficients for the i-th transmission layer in a vector form.

$$a_i = [\alpha_{i,1} \alpha_{i,2} \ldots \alpha_{i,M}]^T \quad \text{<Equation 7>}$$

In what follows, $a_i$ is called a linking vector. A linking vector may be expressed by M elements as shown in Equation 7. However, a vector $b_i$ composed of a normalized first element and the remaining M−1 elements of a linking vector may also be regarded as a linking vector. In other words, relative differences of the remaining M−1 NPPs with respect to the first NPP may be defined as a linking vector. This is so because in many cases, it is assumed that the first element is already normalized from a viewpoint of the whole precoding vector $u_i$. The linking vector $b_i$ may be expressed by Equation 8.

$$\frac{a_i}{\alpha_{i,1}} = \left[1 \frac{\alpha_{i,2}}{\alpha_{i,1}} \frac{\alpha_{i,3}}{\alpha_{i,1}} \ldots \frac{\alpha_{i,M}}{\alpha_{i,1}}\right]^T = [1 b_i^T]^T \quad \text{<Equation 8>}$$

Also, if the same partitioning is performed on each transmission layer, a linking matrix and an NPP in the form of a matrix with respect to each partition may also be defined as shown in Equation 9.

$$A = [a_1 \ldots a_{N_S}]$$

$$V_m = [v_{1,m} \ldots v_{N_S,m}], m=1,\ldots,M \quad \text{<Equation 9>}$$

Suppose a vector which repeats each element of a linking vector of size M by 1 as many times as the size of each partition is denoted as an extended linking vector $\hat{a}_i$. For example, when the number of partitions M is 2 for the i-th transmission layer, size of the first partition is 3, and size of the second partition is 4, $\hat{a}_i$ is expressed by a vector $[\alpha_{i,1}, \alpha_{i,1}, \alpha_{i,1}, \alpha_{i,2} \alpha_{i,2} \alpha_{i,2} \alpha_{i,2}]^T$. By stacking extended linking vectors, an extended linking matrix may be constructed as shown in Equation 10.

$$\hat{A} = [\hat{a}_1 \ldots \hat{a}_{N_S}] \quad \text{<Equation 10>}$$

The whole precoding matrix may be expressed by Equation 11 in the form of Hadamard product (or element-wise product) of an extended linking matrix and an NPP matrix (Vt).

$$U = \hat{A} \circ V_t$$

$$V_t = [V_1^T \ldots V_M^T]^T \quad \text{<Equation 11>}$$

An (extended) linking vector and an (extended) linking matrix act as constituting elements determining precoding of the whole transmission antenna, which are called collectively a linking precoder. As described above, a linking precoder may be expressed by a single equation, but the present invention is not limited to the specific expression. For example, arbitrary partitioning may be performed additionally on a linking vector $a_i$ to construct several sub-linking vectors, according to which a sub-linking precoder may be defined additionally. In what follows, for the purpose of convenience, descriptions are given with respect to a single linking precoder expressed by a single equation.

Also, although the description above is based on the assumption that different linking coefficients are applied to the respective transmission layers within the same partition, linking coefficients may be set independently with respect to a transmission layer if the same partitioning is performed on each transmission layer. In other words, the same linking coefficients may be set for all of the transmission layers. At this time, a linking precoder may be expressed by M or M−1 linking coefficients only.

When partitioned antenna arrays have valid channel characteristics similar to each other, the same precoding may be applied to the corresponding NPP.

Figure 7:
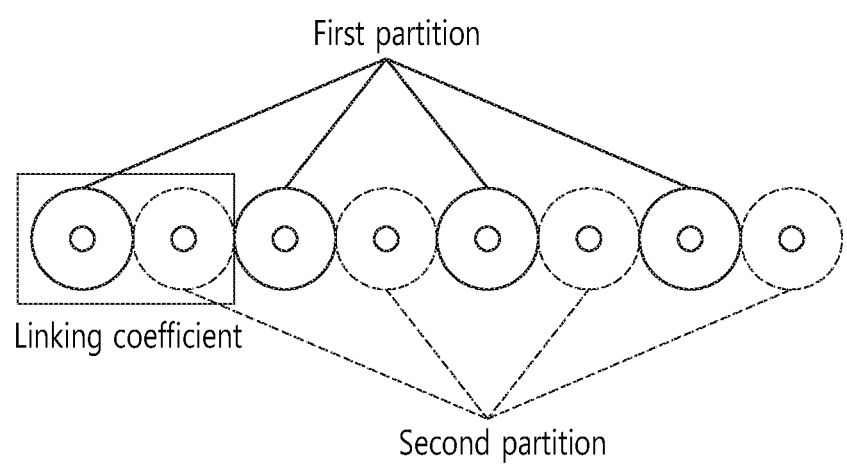
FIG. 7 illustrates one example of aligned partition in a ULA.

FIG. 7 illustrates one example of aligned partition in a ULA. Referring to FIG. 7, in a ULA composed of eight antennas, first partition is composed of 1, 3, 5, and 7-th antenna while second partition is composed of 2, 4, 6, 8-th antenna. If the spacing between adjacent antennas is narrow, and there are not many scatterers in the surroundings, the first and the second partition are likely to encounter a similar MIMO channel except for a phase difference (which corresponds to a linking precoder component) between the partitions. Therefore, the same precoding may be applied to the first and the second partition.

Figure 8:
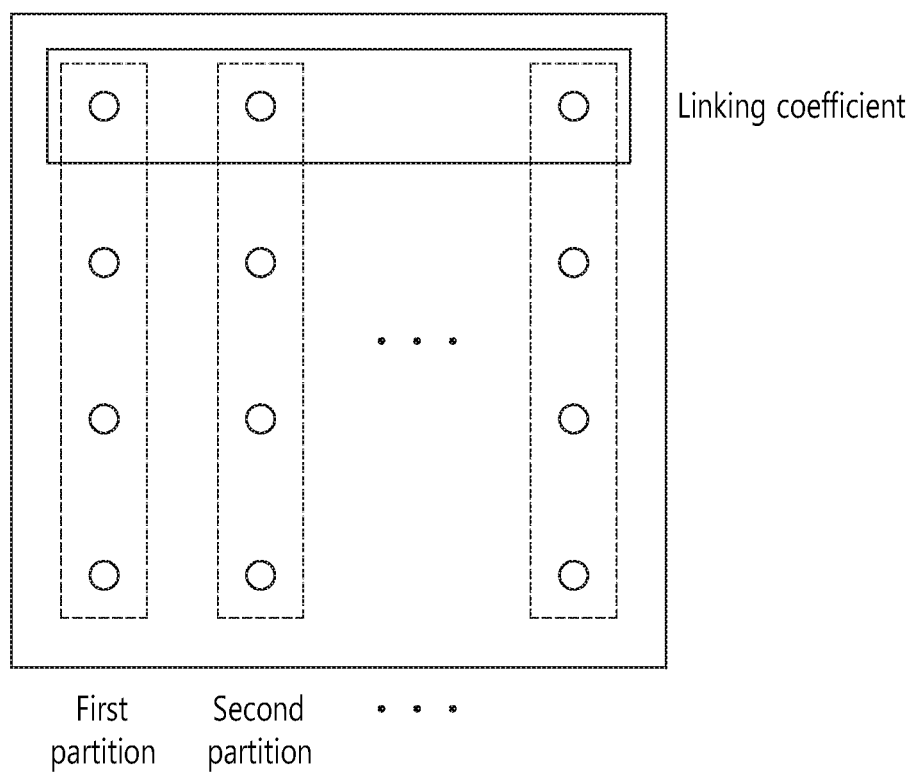
FIG. 8 illustrates one example of column-based aligned partition in a two-dimensional array.

FIG. 8 illustrates one example of column-based aligned partition in a two-dimensional array. Referring to FIG. 8, in a two-dimensional array having a total of Nt (=Nt_h*Nt_v) antennas composed of Nt_v rows and Nt_h columns, each column forms one partition. If the spacing between adjacent columns is narrow and Nt_h is not large, the same precoding may be applied to all of the partitions. However, a linking vector may be set independently of the partitioned precoder.

Figure 9:
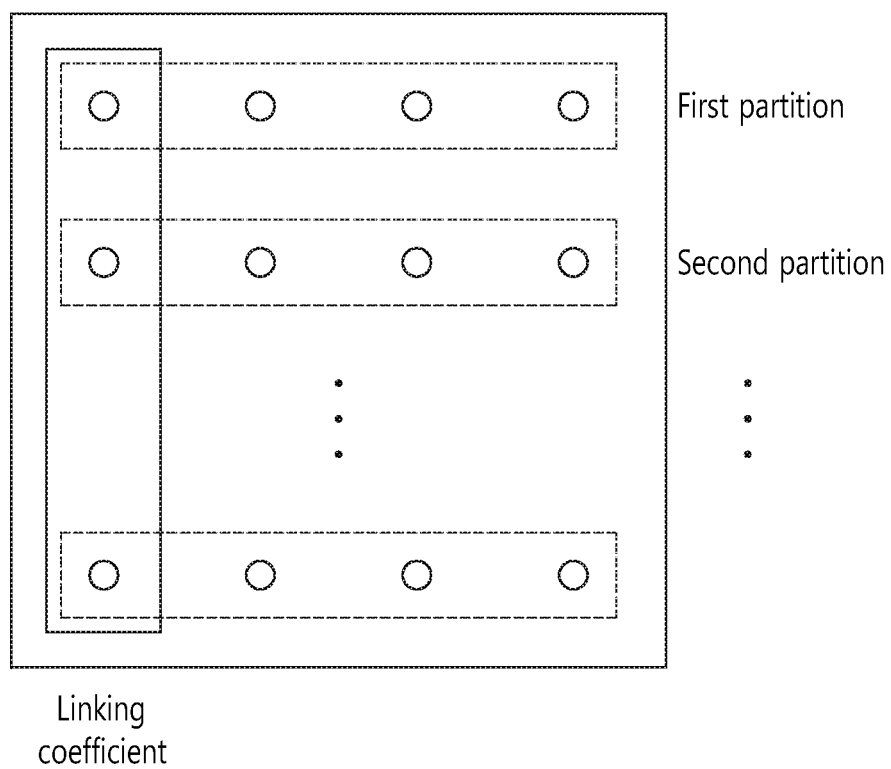
FIG. 9 illustrates one example of row-based aligned partition in a two-dimensional array.

FIG. 9 illustrates one example of row-based aligned partition in a two-dimensional array. Referring to FIG. 9, in a two-dimensional array having a total of Nt (=Nt_h*Nt_v) antennas composed of Nt_v rows and Nt_h columns, each row forms one partition. If the spacing between adjacent rows is narrow, and Nt_v is not large, the same precoding may be applied to all of the partitions. However, a linking vector may be set independently of the partitioned precoder.

In the embodiment above, if sizes of all of the partitions are the same, and the same precoding is applied to all of the partitions, a precoder with respect to the i-th transmission layer may be expressed by the Kronecker product of a linking precoder and a partitioned precoder as shown in Equation 12.

$$u_i = [\alpha_{i,1} v_{i,1}{}^T \alpha_{i,2} v_{i,2}{}^T \ldots \alpha_{i,M} v_{i,M}{}^T]^T = [\alpha_{i,1} v_i{}^T \alpha_{i,2} v_i{}^T \ldots \alpha_{i,M} v_i{}^T]^T = a_i \otimes v_i$$ <Equation 12>

Also, if the same partitioning is applied to all of the transmission layers, a MIMO precoder for the whole transmission layers may be expressed by the Khatri-Rao product of a linking matrix A of size $M*N_S$ and an $(Nt/M)*N_S$ partitioned precoding matrix $V=[V_1 \ldots V_{Ns}]$.

$$U = [a_1 \otimes v_1 \ldots a_{Ns} \otimes v_{Ns}] = A*V$$ <Equation 13>

As illustrated in FIG. 8, if each column of a two-dimensional array forms one partition, the partitioned precoding matrix V performs precoding in the vertical direction, namely vertical beamforming, and the linking matrix A performs precoding in the horizontal direction, namely horizontal beamforming. On the other hand, as illustrated in FIG. 9, if each row of a two-dimensional array forms one partition, the partitioned precoding matrix V performs horizontal beamforming, and the linking matrix A performs vertical beamforming. In other words, if perfectly aligned partitioned precoding is performed in the row or column direction of a two-dimensional array, a precoder performing 3D beamforming may be expressed by one partitioned precoder and one linking precoder, where one of the two precoders performs horizontal beamforming and the other performs vertical beamforming.

Now, CSI feedback for 3D beamforming is described. For closed-loop MIMO precoding, a UE has to transmit an RS or CSI feedback to an eNB. In general, the frequency bands of UL and DL are different from each other in the frequency division duplexing (FDD) system. Therefore, a method in which a UE transmits an RS, and an eNB estimates a DL channel by using channel reciprocity between UL and DL is not suitable. Therefore, in the FDD system, it is preferable that a UE performs transmission by constructing CSI feedback. CSI feedback may be divided into explicit information and implicit information, and considering feedback overhead, implicit information in the form of preferred precoder index (PPI) may be used for most cases. To support closed-loop partitioned precoding by using implicit information, PPI information with respect to each partitioned precoder and PPI information with respect to a preferred linking precoder may be used to construct CSI feedback. In the case of perfectly aligned partitioned precoding in which all of the partitioned precoders are configured in the same way, the eNB has to determine a common partitioned precoder to be applied commonly to all of the antenna partitions and a linking precoder which links each antenna partition. Therefore, the UE has to construct CSI feedback so that the eNB may effectively design the aligned partitioned precoder and the linking precoder. A method for a UE to construct CSI feedback is closely related to a method for an eNB to transmit an RS.

Figure 10:
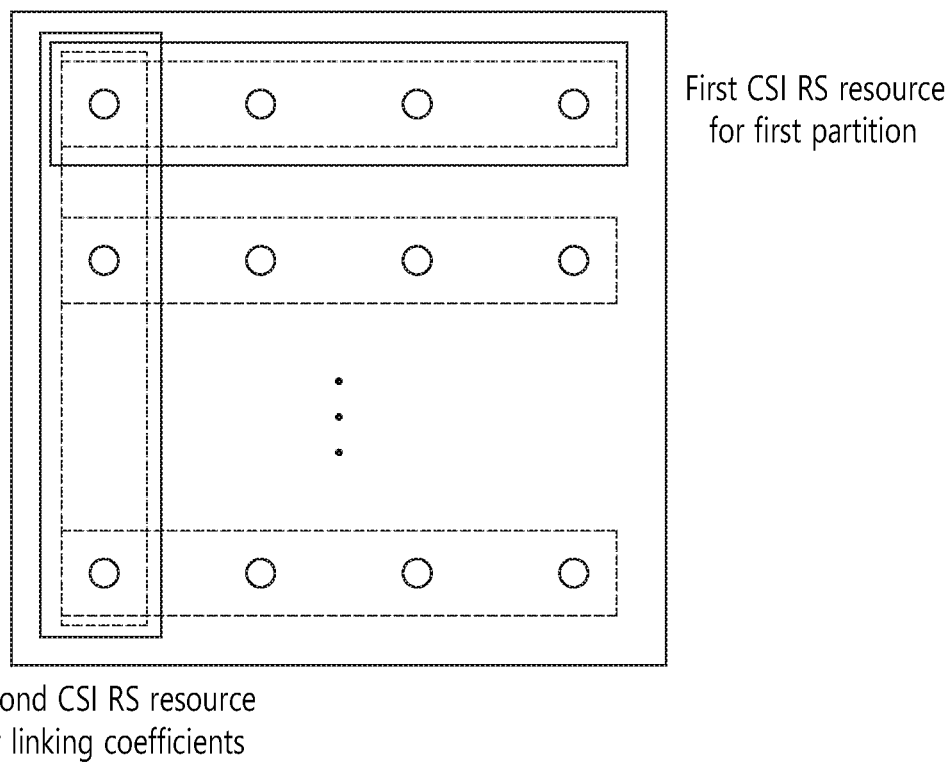
FIG. 10 illustrates one example of a relationship between a CSI RS transmitted by an eNB and partition and linking coefficients.

FIG. 10 illustrates one example of a relationship between a CSI RS transmitted by an eNB and partition and linking coefficients. Referring to FIG. 10, from one antenna partition, a first CSI RS pattern using a first CSI RS resource is transmitted. Also, for all of the partitions, a second CSI RS pattern using a second CSI RS resource is transmitted from a first or any fixed antenna is transmitted. The UE may perform channel measurement in the vertical and horizontal direction separately according to the first and the second CSI RS pattern transmitted by the eNB. The UE may calculate the partitioned precoder and the linking precoder separately from the first and the second CSI RS pattern. For example, the CSI feedback transmitted by the UE may be constructed in the form as follows.

1) PPI to be applied to the first CSI pattern
2) PPI to be applied to the second CSI pattern
3) RI
4) CQI when the case (1), (2), and (3) are applied Since the first and the second CSI RS pattern are transmitted in the row or column direction in the two-dimensional array, the case (1) and (2) above may correspond to the PPI for vertical beamforming and the PPI for horizontal beamforming (or vice versa), respectively.

Figure 11:
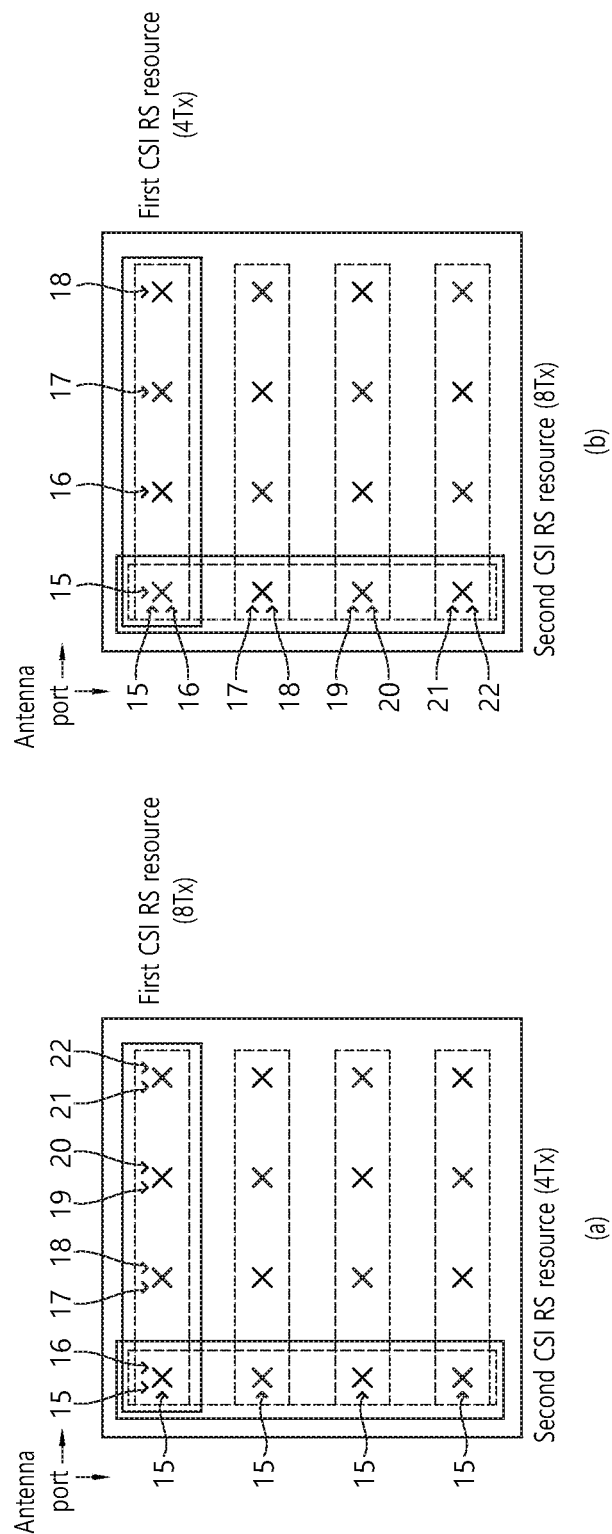
FIG. 11 illustrates one example of a relationship between CSI RS transmitted by an eNB and partition and linking coefficient in a two-dimensional array to which polarization is applied.

FIG. 11 illustrates one example of a relationship between CSI RS transmitted by an eNB and partition and linking coefficient in a two-dimensional array to which polarization is applied. The embodiment of constructing CSI feedback described above may be applied irrespective of polarization of the antenna of an eNB. For example, the embodiment assumes that the number of antenna rows (hereinafter M) is 4, the number of antenna columns (hereinafter N) is 4, and polarization dimension (hereinafter P) is 2 in a two-dimensional array. At this time, one partition may be constructed by applying a specific polarization antenna to a row. In other words, in a two-dimensional array constructed in the configuration of (M, N, P), a precoder may be constructed by considering that the number of horizontal antennas is M*P, and the number of vertical antennas is N. or a precoder may be constructed by considering that the number of horizontal antennas is M, and the number of vertical antennas is N*P. Referring to FIG. 11(a), among the CSI feedback information, the number of transmission antennas constituting horizontal PMI (H-PMI) is M*P, and the number of transmission antennas constituting vertical PMI (V-PMI) is N. Also, referring to FIG. 11(b), among the CSI feedback information, the number of transmission antennas constituting H-PMI is M, and the number of transmission antennas constituting V-PMI is N*P.

As described above, H-PMI and V-PMI, which are CSI feedback information with respect to both the horizontal and the vertical direction, has to be fed back from the eNB for 3D beamforming. However, the PUCCH format 2/2a/2b which is the existing PUCCH format supporting CSI feedback has a very limited payload size (for example, 11 bit). Therefore, for 3D beamforming, an efficient method for transmitting H-PMI and V-PMI through PUCCH format 2/2a/2b periodically is required.

Meanwhile, the UE may perform CSI feedback by using a non-precoded CSI RS resource or perform CSI feedback by using a beamformed CSI RS resource. In other words, if the eNB initially transmits a CSI RS while not performing 3D beamforming, the UE may perform CSI feedback by using a non-precoded CSI RS resource. The CSI RS transmitted subsequently is a CSI RS precoded according to 3D beamforming. Therefore, the UE may subsequently perform CSI feedback by using the beamformed CSI RS resource.

According to one embodiment of the present invention, to transmit CSI feedback by using a beamformed CSI RS resource, the UE first performs measurement by using at least one beamformed CSI RS resource, determines a preferred beam direction based on the measurement result, and transmits information about a beam direction and CSI feedback to the eNB. Information about a beam direction transmitted by the UE may be expressed by a UE-preferred beam index (BI) or index of a UE-preferred CSI RS resource. The information about the beam direction and CSI feedback may be transmitted to the eNB through the PUCCH format 2/2a/2b.

At this time, the PTI included in the CSI feedback may be used as an indicator or a flag for determining whether the CSI feedback is based on a non-precoded CSI-RS resource or a beamformed CSI RS resource. In other words, while the conventional PTI indicates whether CSI feedback is associated with wideband or sub-band, a new PTI indicates whether CSI feedback is based on a non-precoded CSI-RS resource or a beamformed CSI RS resource. Accordingly, the UE may inform the eNB that the CSI feedback transmitted by the UE is based on a non-precoded CSI RS resource or a beamformed CSI RS resource. Similarly, a PTI included in the CSI feedback may be replaced with a new indicator that indicates whether a CSI RS resource is precoded. Also, PTI may have a length of 2 bits or more and may indicate not only whether CSI feedback is based on a non-precoded CSI RS resource or a beamformed CSI RS resource but also whether CSI feedback is intended for vertical beamforming or horizontal beamforming.

Figure 12:
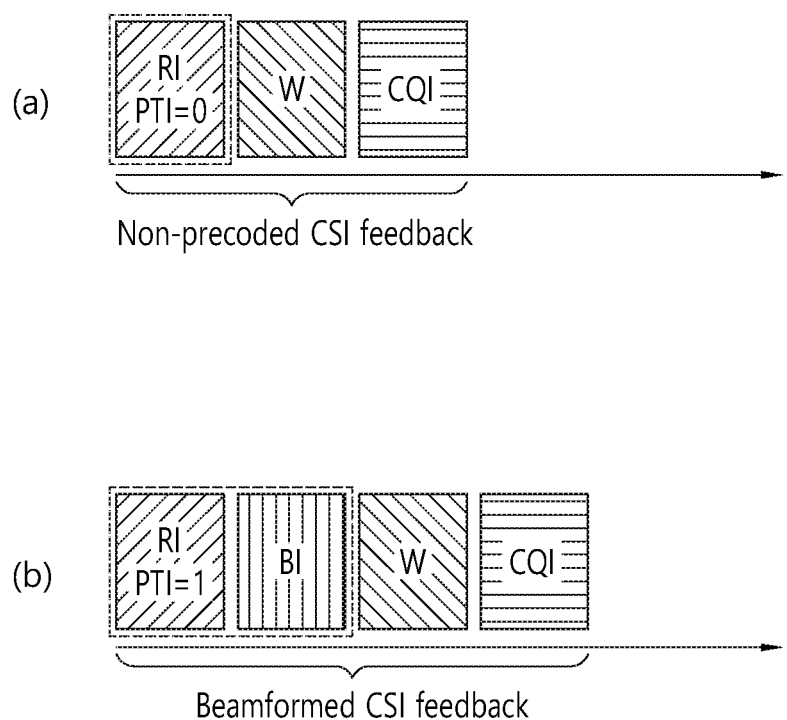
FIG. 12 illustrates one example of CSI feedback transmission according to one embodiment of the present invention.

FIG. 12 illustrates one example of CSI feedback transmission according to one embodiment of the present invention. Referring to FIG. 12($a$), when PTI is set to 0, measurement is performed by using a non-precoded CSI RS resource, and CSI feedback based on the measurement may be transmitted. At this time, the feedback information may include PMI and/or RI and/or CQI. On the other hand, referring to FIG. 12($b$), when PTI is set to 1, measurement is performed by using a beamformed CSI RS resource, and CSI feedback based on the measurement may be transmitted. At this time, the feedback information may include information about a UE-preferred beam and/or PMI and/or RI and/or CQI.

Figure 13:
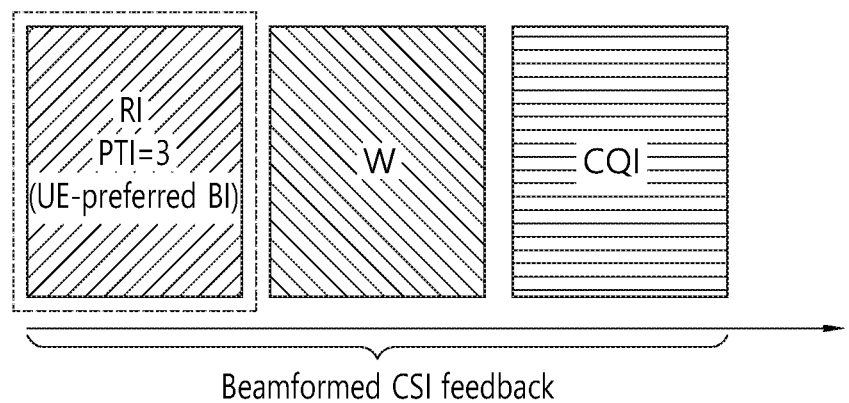
FIG. 13 illustrates another example of CSI feedback transmission according to one embodiment of the present invention.

FIG. 13 illustrates another example of CSI feedback transmission according to one embodiment of the present invention. In the embodiment of FIG. 13, PTI is used for information about a UE-preferred beam. Information about a UE-preferred beam may be a beam index. According to the number of directions of a selectable beamformed beam, PTI may have a length of 1 bit or 2 bits or more. Referring to FIG. 13, PTI is set to 3, which corresponds to the information about a UE-preferred beam. In other words, the PTI may inform the eNB that the UE prefers a beam the beam index of which is 3. At this time, the PTI may implicitly indicate that CSI feedback is based on a beamformed CSI RS resource.

As described above, when a UE-preferred beam is selected according to the number of directions of a selectable beamformed beam and information about the selected UE-preferred beam is fed back through PTI, the length of the PTI is obtained by log 2 (the number of beams). However, to reduce the length of the PTI, the UE may first inform the eNB of a set of beam candidates (for example, a set of beam candidates S={beam #2, #3} from among beams #0 to #7) to which UE-preferred beams may belong through a data channel. Afterwards, among the beams included in the set of beam candidates informed previously to the eNB, the UE may inform the eNB of the information about UE-preferred beams through PTI. At this time, instead of informing of the indexes of UE-preferred beams directly (for example, PTI=010 for beam #2 and PTI=011 for beam #3), the UE may inform the eNB of the order of the beam within the set of beam candidates informed previously to the eNB. For example, suppose the UE informs the eNB of a set of beam candidates S={beam #2, #3} in advance. Then PTI=0 may indicate the beam #2 which is a first constituting element of the set of beam candidates S, and PTI=1 may indicate the beam #3 which is a second constituting element of the set of beam candidates S. Accordingly, the UE may reduce feedback overhead with respect to the information about UE-preferred beams.

Figure 14:
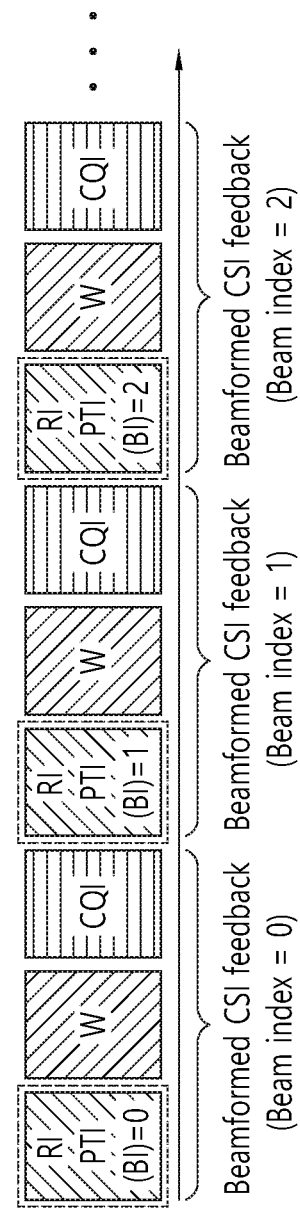
FIG. 14 illustrates another example of CSI feedback transmission according to one embodiment of the present invention.

FIG. 14 illustrates another example of CSI feedback transmission according to one embodiment of the present invention. In the embodiment of FIG. 14, PTI corresponds to beam information. In other words, PTI corresponds to beam information such as a beam index and CSI RS resource index. Following the PTI, CSI feedback with respect to the corresponding beam (namely PMI/RI/CQI) is transmitted to the eNB. At this time, different from the embodiments of FIGS. 12 and 13, not only the CSI feedback with respect to one UE-preferred beam but also CSI feedback with respect to all of the beamformed beams is transmitted. Referring to FIG. 14, PTI=0 (and RI) is first transmitted, and transmission of CSI feedback with respect to the beam index of 0 may be subsequently indicated. And CSI feedback (PMI/CQI) with respect to the beam index of 0 is transmitted. Next, PTI=1 (and RI) is transmitted, and transmission of CSI feedback with respect to the beam index of 1 may be subsequently indicated. And CSI feedback (PMI/CQI) with respect to the beam index of 1 is transmitted. Next, PTI=2 (and RI) is transmitted, and transmission of CSI feedback with respect to the beam index of 2 may be subsequently indicated. And CSI feedback (PMI/CQI) with respect to the beam index of 2 is transmitted.

Figure 15:
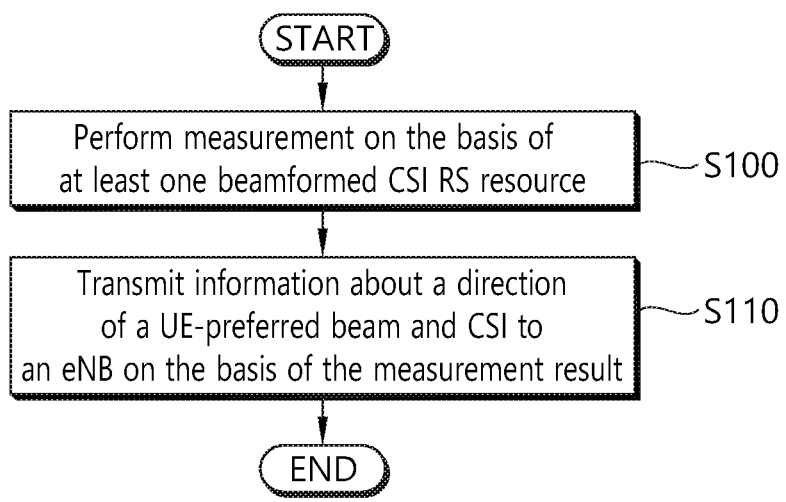
FIG. 15 illustrates a method for a UE to transmit CSI according to one embodiment of the present invention.

FIG. 15 illustrates a method for a UE to transmit CSI according to one embodiment of the present invention. The present invention described above may be applied to the embodiment of FIG. 15.

In the S100 step, the UE performs measurement by using at least one beamformed CSI RS resource. In the S110 step, the UE transmits information about a preferred beam and the CSI to the eNB by using the measurement result. At this time, the CSI includes PTI, and the PTI indicates whether the measurement is based on the non-precoded CSI RS resource or the beamformed CSI RS resource. The PTI may indicate that the measurement is based on the beamformed CSI RS resource, and at this time, the value of the PTI may be 1. Also, the information about a preferred beam may include at least one of the beam index of the UE-preferred beam or the index of the UE-preferred CSI RS resource. The CSI may include at least one of CQI, PMI, and RI of the UE-preferred beam. The information about the preferred beam and the CSI may be transmitted periodically through PUCCH 2/2a/2b.

The PTI may further indicate information about the preferred beam. At this time, the PTI may have the length of 1 bit or more. The PTI may indicate the information about the preferred beam from among a set of beam candidates to which the preferred beam may belong. At this time, the set of beam candidates may be transmitted to the eNB in advance.

Figure 16:
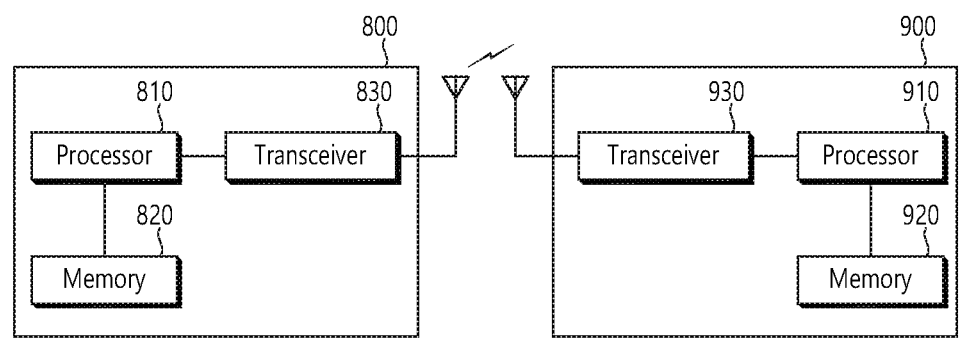
FIG. 16 shows a wireless communication system to implement an embodiment of the present invention.

FIG. 16 shows a wireless communication system to implement an embodiment of the present invention.

A BS 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
    receiving, from a base station, a plurality of beamformed channel state information reference signals (CSI-RSs) transmitted through a plurality of beams;
    transmitting, to the base station, information for a set of candidate beams which are part of the plurality of beams, on a data channel; and
    transmitting, to the base station, a precoding type indicator (PTI) informing a preferred beam among the candidate beams, on a physical uplink control channel (PUCCH),
    wherein the preferred beam is determined based on a result of a measurement on the plurality of beamformed CSI-RSs,
    wherein a size of the PTI is determined based on a number of the candidate beams, and
    wherein each possible bit value of the PTI is mapped to each element of the set of the candidate beams.

2. The method of claim 1, further comprising:
    transmitting, to the base station, CSI comprising the PTI, wherein the PTI informs that the measurement is performed based on the beamformed CSI-RSs.

3. The method of claim 2, wherein the CSI comprises at least one of a channel quality indicator (CQI), a precoding matrix indicator (PMI), or a rank indicator (RI) for the preferred beam.

4. The method of claim 2, wherein the CSI is transmitted periodically to the base station.

5. The method of claim 1, wherein the PTI informs a CSI-RS resource of a beamformed CSI-RS among the plurality of beamformed CSI-RSs, and
    wherein the beamformed CSI-RS is mapped to the preferred beam.

6. A wireless device in a wireless communication system, the wireless device comprising:
    a memory;
    a transceiver; and
    at least one processor, operably coupled to the memory and the transceiver, configured to control the transceiver to:
    receive, from a base station, a plurality of beamformed channel state information reference signals (CSI-RSs) transmitted through a plurality of beams,
    transmit, to the base station, information for a set of candidate beams which are part of the plurality of beams, on a data channel, and
    transmit, to the base station, a precoding type indicator (PTI) informing a preferred beam among the candidate beams, on a physical uplink control channel (PUCCH),
    wherein the preferred beam is determined based on a result of a measurement on the plurality of beamformed CSI-RSs,
    wherein a size of the PTI is determined based on a number of the candidate beams, and
    wherein each possible bit value of the PTI is mapped to each element of the set of the candidate beams.

7. The wireless device of claim 6, wherein the at least one processor is configured to transmit, to the base station, CSI comprising the PTI,
    wherein the PTI informs that the measurement is performed based on the beamformed CSI-RSs.

8. The wireless device of claim 7, wherein the CSI comprises at least one of a channel quality indicator (CQI), a precoding matrix indicator (PMI), or a rank indicator (RI) for the preferred beam.

9. The wireless device of claim 7, wherein the CSI is transmitted periodically to the base station.

10. The wireless device of claim 6, wherein the PTI informs a CSI-RS resource of a beamformed CSI-RS among the plurality of beamformed CSI-RSs, and
    wherein the beamformed CSI-RS is mapped to the preferred beam.

* * * * *